US006278343B1

(12) United States Patent
Okada et al.

(10) Patent No.: US 6,278,343 B1
(45) Date of Patent: Aug. 21, 2001

(54) DIELECTRIC FILTER, DIELECTRIC DUPLEXER, AND COMMUNICATION APPARATUS

(75) Inventors: Takahiro Okada; Jinsei Ishihara; Hideyuki Kato, all of Ishikawa-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/421,051

(22) Filed: Oct. 19, 1999

(30) Foreign Application Priority Data

Oct. 20, 1998 (JP) .................................................. 10-298903

(51) Int. Cl.[7] ................................ G01P 1/20; G01P 5/12

(52) U.S. Cl. ........................... 333/206; 333/202; 333/134

(58) Field of Search .................................... 333/202, 206, 333/134

(56) References Cited

U.S. PATENT DOCUMENTS 5,327,109 7/1994 Hoang et al. .
5,783,980 7/1998 Blair er al. .
5,929,725 7/1999 Toda et al. .
6,064,283 * 5/2000 Asada .................................. 333/202

FOREIGN PATENT DOCUMENTS 43 19 214 A1 12/1994 (DE) .
4-356801 * 12/1992 (JP) .
08-032307 A 7/1994 (JP) .
11-205014 * 7/1999 (JP) .

OTHER PUBLICATIONS

Search Report.

* cited by examiner

*Primary Examiner*—Robert Pascal
*Assistant Examiner*—Patricia T. Nguyen
(74) *Attorney, Agent, or Firm*—Ostrolenk, Faber, Gerb & Soffen, LLP

(57) ABSTRACT

A dielectric filter, a dielectric duplexer, and a communication apparatus are able to obtain a desired external coupling without adversely affecting the Qo, and are inexpensive and have excellent characteristics. A ridgeline between an open-side end surface and a mounting surface of a dielectric block is removed to form a slope, and input/output electrodes are provided extending from near the open-side end surface of the slope and crossing to the mounting surface, the input/output electrodes being isolated from a ground conductor.

7 Claims, 7 Drawing Sheets

DIELECTRIC FILTER, DIELECTRIC DUPLEXER, AND COMMUNICATION APPARATUS

BACKGROUND OF THE INVENTION

1. Field of the Invention

The present invention relates to a dielectric filter, a dielectric duplexer, and a communication apparatus using the same, which are used, for instance, in a microwave band.

2. Description of the Related Art

FIGS. 11A and 11B show an example of a structure of a conventional dielectric filter, in which the effects of electromagnetic field leakage are reduced by providing an open terminal indented from an end surface of a dielectric block, thereby obtaining the desired coupling between resonators. FIG. 11A is a perspective view from the open end, and FIG. 11B is a cross-sectional view taken horizontally through the center.

The dielectric filter comprises inner conductors 13*a* and 13*b*, which are provided in through-holes 12*a* and 12*b*, respectively, running between two opposing end surfaces of a dielectric block 11. A ground conductor 15 is provided substantially over all outer surfaces of the dielectric block 11. Input/output electrodes 16*a* and 16*b* are provided extending from one major surface, which constitutes a mounting surface, to the side faces. In the inner conductors 13*a* and 13*b* (hereinafter referred to as open-side end surface) of each of the through-holes 12*a* and 12*b*, portions devoid of inner conductor i.e., nonconductive portion g are provided near one open surface. These nonconductive portions g function as open terminals, and the ground conductor 15 is short-circuited at the other open surface (hereinafter referred to as short-circuiting-side end surface).

The dielectric filter comprises two resonators formed by the inner conductors 13*a* and 13*b*. The resonators are coupled together by stray capacitance Cs, created in the nonconductive portions g, and are coupled externally by external coupling capacitance Ce, created between the inner conductors 13*a* and 13*b* and the corresponding inpu/output electrodes 16*a* and 16*b*. The external coupling capacitance Ce is adjusted by altering the position and area of the input/output electrodes 16*a* and 16*b* to achieve an appropriate external coupling.

Ordinarily, the greater the area of the input/output electrodes, and the closer the electrodes are positioned to the short-circuiting-side end surface, the worse the Qo of the resonators. That is, in order to prevent deterioration in the Qo, the input/output electrodes must be positioned closer to the open-side end surface and their areas must be reduced.

However, the conventional dielectric filter described above has a disadvantage in that, although it is possible to prevent deterioration in the Qo by providing the input/output electrodes near to the open-side end surface, the nonconductive portions g are provided at positions indented from the open-side end surface, and consequently the opposing area of the input/output electrodes and the inner conductors is reduced, thereby reducing the external coupling capacitance and making it impossible to obtain a desired external coupling.

There is a further problem in that operations such as changing the orientation of the dielectric block are necessary to provide the input/output electrodes on opposite side faces as in the conventional example described above, consequently increasing the cost of providing the input/output electrodes. Furthermore, when the input/output electrodes are provided only on the mounting surface, it is not easy to confirm the state of the solder after mounting.

SUMMARY OF THE INVENTION

To overcome the above described problems, preferred embodiments of the present invention provide a dielectric filter, a dielectric duplexer, and a communication apparatus capable of obtaining a desired external coupling with no deterioration in Qo, which are inexpensive and have excellent characteristics.

One preferred embodiment of the present invention provides a dielectric filter comprising: a plurality of through-holes provided between a pair of opposing end surfaces of a dielectric block; inner conductors provided inside the through-holes; a ground conductor provided on the outer surfaces of the dielectric block; nonconductive portions provided near one end surface, said end surface being regarded as an open-side end surface, and one major surface of the dielectric block being regarded as a mounting surface; at least part of a ridgeline between the open-side end surface and the mounting surface of the dielectric block being removed; and at least one input/output electrode, which is capacitance-coupled to a predetermined inner conductor, being provided crossing from the removed portion to the mounting surface.

Preferably, the removed portion forms a slope, a curved face, or a step.

Another preferred embodiment of the present invention provides a dielectric duplexer comprising at least two filter portions provided in a dielectric block, and at least one of the filter portions is the dielectric filter according to the present invention.

Yet another preferred embodiment of the present invention provides a communication apparatus comprising at least one of the dielectric filters and the dielectric duplexer of the present invention.

In the dielectric filter and dielectric duplexer of the configuration described above, since the ridgeline between the open-side end surface and the mounting surface of the dielectric block is removed, and input/output electrodes are provided crossing from the removed portion to the mounting surface, shortening the distance between the input/output electrodes and the inner conductors, a greater external coupling capacitance can be obtained. More specifically, the input/output electrode in the configuration of the present invention achieves a greater external coupling than a conventional input/output electrode of the same area, and can achieve the same external coupling capacitance while having a smaller area.

That is, even when the open end is indented at a position further inward than the open-side end surface, the input/output electrodes can be provided near the open-side end surface. In addition, the area of the input/output electrodes is small, making it possible to easily obtain a desired external coupling capacitance. Therefore, a desired external coupling can be achieved without adversely affecting the Qo of the resonators.

Furthermore, the removed portion can be more easily molded and cut away by making it a sloping face, a curved face, or a step. In addition, the input/output electrodes can be easily provided. These operations can be particularly easily performed when the removed portion is a slope.

Furthermore, since the input/output electrodes are provided only in one direction on the mounting surface side, they can be provided easily and with high precision. In addition, the state of the solder from the open-side end surface can be confirmed after mounting.

It is only necessary that at least one of the multiple input/output electrodes has the configuration of the present invention. The other input/output portions may be externally coupled by other means such as, for instance, external coupling holes.

Furthermore, the communication apparatus of the present invention comprises the dielectric filter or the dielectric duplexer having the characteristics described above. Consequently, the communication apparatus is inexpensive and has excellent characteristics.

DESCRIPTION OF THE PREFERRED EMBODIMENTS

Figure 1:
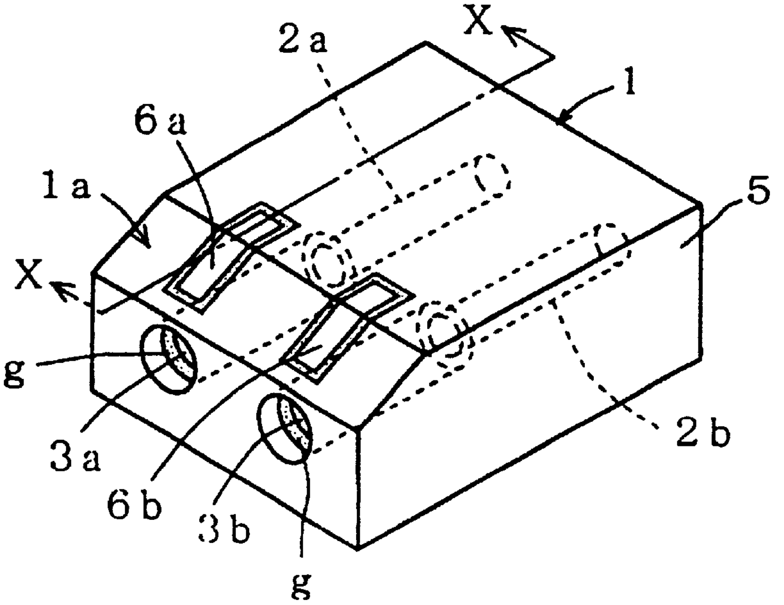
FIG. 1 is a perspective view of a dielectric filter according to a first embodiment.
Figure 2:
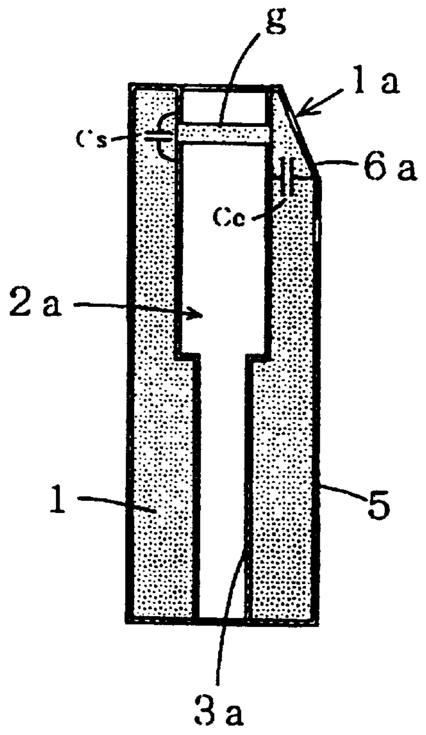
FIG. 2 is a cross-sectional view of the dielectric filter according to the first embodiment.

A structure of a first preferred embodiment of the dielectric filter of the present invention will be described in detail below with reference to FIGS. 1 and 2. FIG. 1 is a perspective view of the dielectric filter from an open-side end surface when a mounting surface is at the top, and FIG. 2 is a cross-sectional view taken along the line X—X.

The dielectric filter of the present embodiment comprises holes and electrodes of predetermined shapes provided in a substantially rectangular box-like dielectric block 1. The dielectric block 1 is constructed by cutting away a ridgeline at the intersecting region between one end surface, which forms the open-side end surface, and one major surface, which forms the mounting surface. The cut-away portion forms a slope 1*a*.

Two through-holes 2*a* and 2*b* run between the open-side end surface and a short-circuiting end surface of the dielectric block 1. Inner conductors 3*a* and 3*b* are provided on the inner faces of the through-holes 2*a* and 2*b*, respectively. Portions devoid of inner conductor i.e., nonconductive portion g are provided in the inner conductors 3*a* and 3*b* indented by a certain depth from the open-side end surface, and form open ends. A ground conductor 5 is provided substantially over all faces of the dielectric block 1. Input/output electrodes 6*a* and 6*b* are provided from the open-side end surface of the slope 1*a* of the dielectric block 1 to the mounting surface, and are isolated from the ground conductor 5. The input/output electrodes 6*a* and 6*b* are positioned substantially opposite to the inner conductors 3*a* and 3*b*, respectively, so as to obtain a greater capacitance between the inner conductors 3*a* and 3*b*. The through-holes 2*a* and 2*b* have a stepped hole structure whereby their internal diameters are greater on the side near the open-side end surface, and smaller on the side near the short-circuiting end surface.

This dielectric filter comprises two resonators formed by the inner conductors 3*a* and 3*b*. The resonators are coupled together by the stepped holes and by stray capacitance Cs created in the nonconductive portions g, and are coupled externally by external coupling capacitance Ce created between the inner conductors 3*a* and 3*b* and the corresponding input/output electrodes 6*a* and 6*b*.

The ridgeline between the open-side end surface and the mounting surface, that is, the slope 1*a*, is usually formed by using a metal of the same shape during the formation of the dielectric block 1. Alternatively, the slope 1*a* may be provided by using a cutter after the rectangular box-like dielectric block 1 has been molded and heated. Furthermore, the nonconductive portions g and the input/output electrodes 6*a* and 6*b* are added after the formation of the inner conductors 3*a* and 3*b* and the ground conductor 5, by removing parts of these conductors using a router, an ultrasonic processing tool, or the like.

The present embodiment describes an example in which the through-holes have a stepped hole structure, but the through-holes may alternatively be straight holes. Furthermore, the present embodiment describes an example where the dielectric filter has a two-level configuration, but the dielectric filter may comprise resonators in a configuration of three stages or more, wherein three or more inner conductors are provided in the dielectric block. In this case, the input/output electrodes are provided opposite the inner conductors of the input/output portion.

As shown in FIG. 2, in the constitution of the present embodiment, parts of the input/output electrodes extend to the slope near the open-side end surface, so that the distance from the input/output electrodes to the inner conductors is partially shorter, thereby obtaining a greater external coupling capacitance Ce. That is, even when the input/output electrodes are provided near to the open-side end surface, a desired external coupling can be easily obtained without increasing the area of the input/output electrodes. Therefore, it is possible to obtain a dielectric filter with excellent characteristics, having the desired external coupling and no reduction in Qo. Furthermore, since the removed portion is a slope, it can be easily molded or cut away, enabling the input/output electrodes to be formed easily. Moreover, since the input/output electrodes are provided only in one direction on the mounting surface, they can be provided easily and with high precision. In addition, the state of the solder can be confirmed from the open-side end surface side after the dielectric filter has been mounted.

Next, various modifications to the removed portion of the present invention will be explained. In each embodiment described below, the configuration is almost identical to that shown in the first embodiment, with the exception of the removed portion, and for this reason further explanation of other parts will be omitted. The following embodiments achieve the same effects as the first embodiment.

Figure 3:
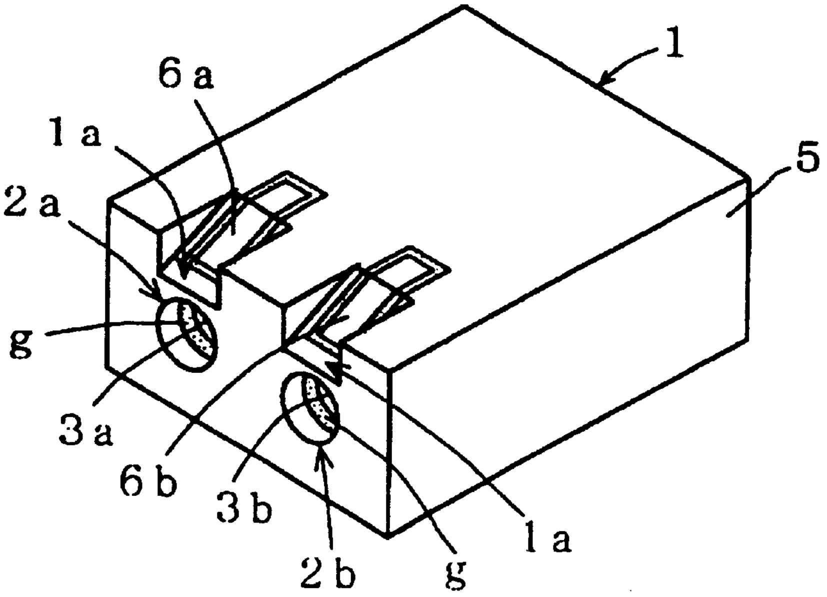
FIG. 3 is a perspective view of a dielectric filter according to a second embodiment.

FIG. 3 shows a configuration of a dielectric filter according to a second embodiment of the present invention. In the first embodiment, the ridgeline between the open-side end surface and the mounting surface was completely removed to form a slope. However, in the present embodiment, parts of the ridgeline are removed to form slopes 1*a* for each of the input/output electrodes 6*a* and 6*b*. In this configuration, the input/output electrodes 6*a* and 6*b* are provided using minimal removed portions. Since the removed portions of the dielectric block are reduced in this way, the Qo of the resonators can be increased more than in the first embodiment.

Figure 4:
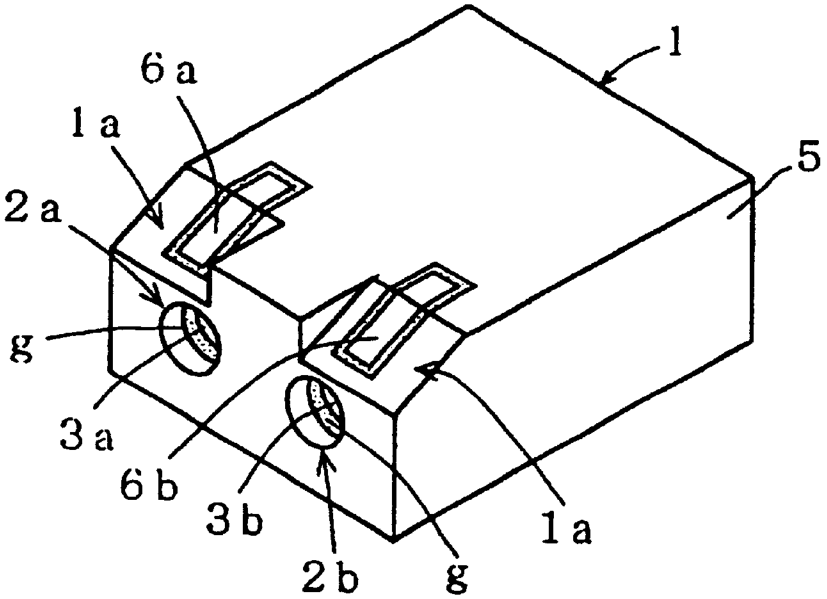
FIG. 4 is a perspective view of a dielectric filter according to a third embodiment.

FIG. 4 shows a configuration of a dielectric filter according to a third embodiment of the present invention. In the present embodiment, parts of the ridgeline, from the regions where the input/output electrodes 6*a* and 6*b* are provided to the side faces of the dielectric block 1, are removed to form slopes 1*a*.

Figure 5:
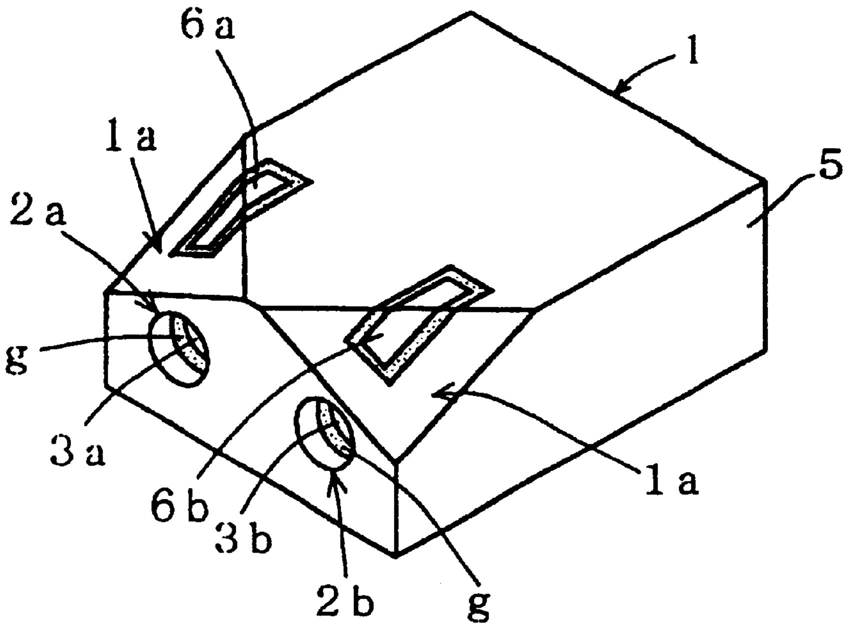
FIG. 5 is a perspective view of a dielectric filter according to a fourth embodiment.

FIG. 5 shows a configuration of a dielectric filter according to a fourth embodiment of the present invention. In the present embodiment, the slopes 1*a* are provided by removing the portions at the corner of the open-side end surface, the mounting surface, and the side faces, so that they slope towards their respective faces.

Figure 6:
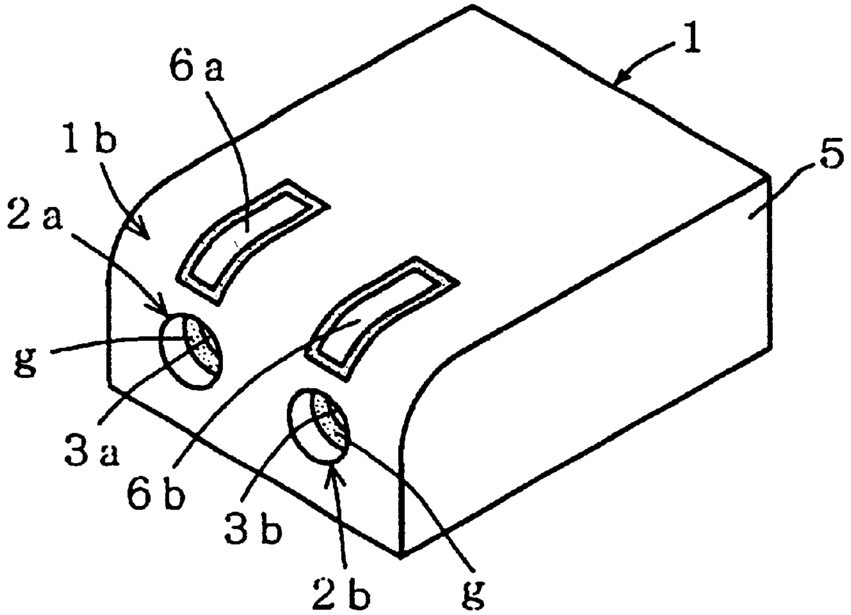
FIG. 6 is a perspective view of a dielectric filter according to a fifth embodiment.

FIG. 6 shows a configuration of a dielectric filter according to a fifth embodiment of the present invention. In the first embodiment, the slope was provided by removing the ridgeline of the open-side end surface and the mounting surface. However, in the present embodiment, the small radius of curvature of the entire ridgeline is chamfered so that the removed portion forms a curved face 1*b*. Although not shown in the diagram, it is possible to partially remove the ridgeline as shown in embodiments 2 to 4, even when the removed portion forms a curved face. Conversely, the ridgeline may be removed to form a convex C-shaped curved face.

Figure 7:
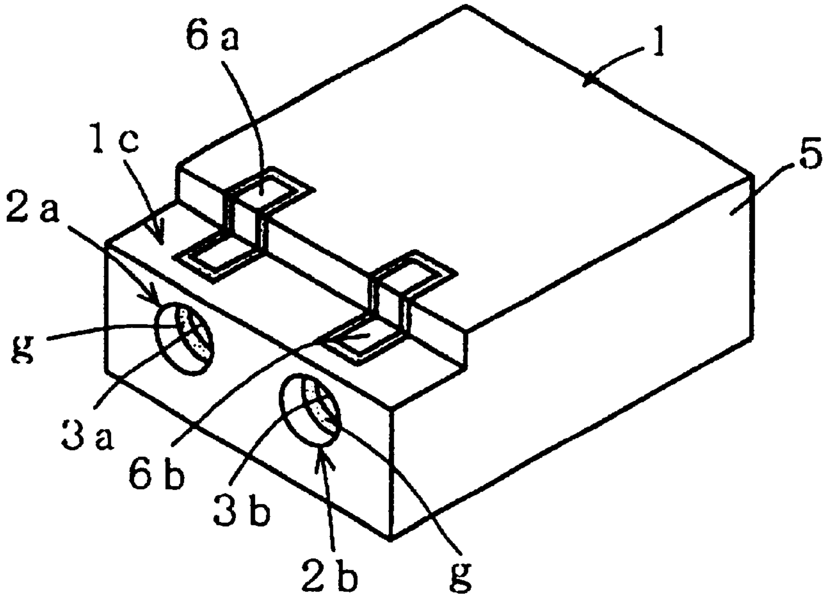
FIG. 7 is a perspective view of a dielectric filter according to a sixth embodiment.

FIG. 7 shows a configuration of a dielectric filter according to a sixth embodiment of the present invention. In the first embodiment, the slope was formed by removing the ridgeline of the open-side end surface and the mounting surface. However, in the present embodiment, the entire ridgeline is removed to form a rectangular shape, so that the removed portion has a step 1*c* comprising two flat faces.

Figure 8:
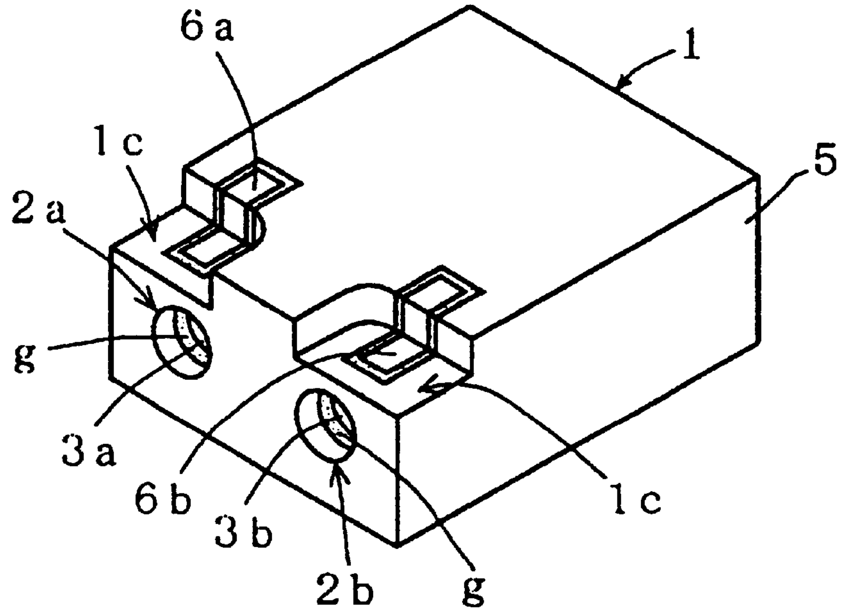
FIG. 8 is a perspective view of a dielectric filter according to a seventh embodiment.

FIG. 8 shows a configuration of a dielectric filter according to a seventh embodiment of the present invention. In the present embodiment, parts of the ridgeline from the region where the input/output electrodes 6*a* and 6*b* are provided to the side faces of the dielectric block 1 are removed in a substantially rectangular shape to form stepped faces 1*c*. Further, the corners of the rectangular removed portion are chamfered to form curved faces. In this way, deterioration of Qo of the resonators is prevented by chamfering.

In each of the embodiments described above, the small radius of curvature of the ridgelines (corners) where the flat faces of the dielectric block intersect can be minutely chamfered in order to prevent cracking, chipping, and loss of Qo.

Figure 9:
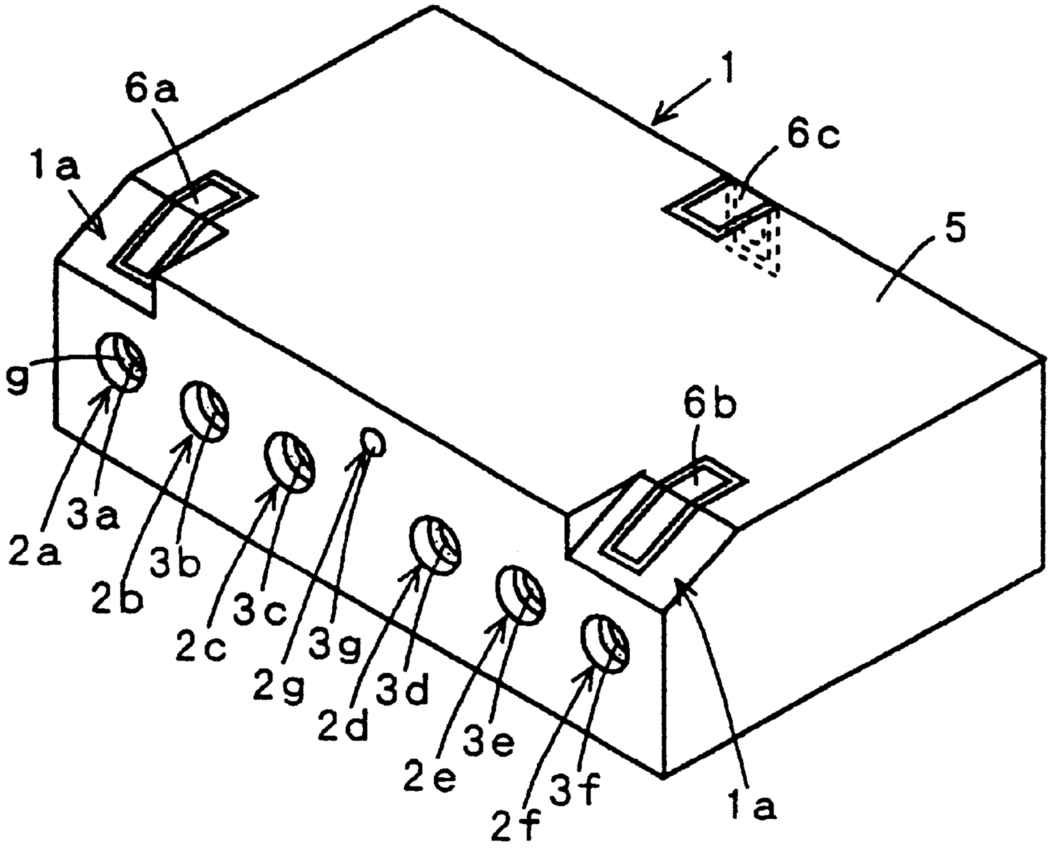
FIG. 9 is a perspective view of a dielectric filter according to an eighth embodiment.

Next, FIG. 9 shows a configuration of a dielectric duplexer (antenna duplexer) according to an eighth embodiment of the present invention. The transmitting side and the receiving side of the dielectric duplexer of the present embodiment each comprise a three-stage bandpass filter. Both ends of the ridgeline between the open-side end surface and the mounting surface of the dielectric block 1 are removed to form slopes 1*a*.

Seven through-holes 2*a* to 2*g* are provided between the two end surfaces of the dielectric block 1, and inner conductors 3*a* to 3*g* are provided on the inner faces of the through-holes 2*a* to 2*e*. The portion containing the through-holes 2*a* to 2*c* constitutes a transmission filter comprising a three-stage resonator, and the portion containing the through-holes 2*d* to 2*f* constitutes a reception filter comprising a three-stage resonator. Portions devoid of inner conductors i.e., nonconductive portions g form open ends and are provided indented by a certain depth from the open-side end surface in the inner conductors 3*a* to 3*c,* and 3*d* to 3*f,* and in the through-holes 2*a* to 2*c,* and 2*d* to 2*f*. A ground electrode 5 is provided over substantially all faces of the dielectric block 1. Input/output electrodes 6*a*, 6*b*, and 6c are isolated from the ground electrode 5. The input/output electrode 6*a* functions as a transmission terminal of the transmission filter. The input/output electrode 6*b* functions as a reception terminal for the reception filter. The input/output electrode 6*c* functions as an antenna terminal sharing the input and output of the transmission and reception filters.

The input/output electrodes 6*a* and 6*b* extend from the open-side end surface of the dielectric block 1 to the mounting surface. The input/output electrodes 6*a* and 6*b* are capacitance-coupled to the inner conductors 3*a* and 3*f*, and their capacitance provides an external coupling. The input/output electrode 6*c* connects to the inner conductor 3*g* in the through-hole 2*g,* and extends across to the short-circuiting end surface and the mounting surface. The inner conductor 3*g* and the inner conductors 3*c* and 3*d* beside it are electromagnetically coupled by interdigital coupling, thereby externally coupling the input/output of either the transmission filter or the reception filter (input/output coupling). The input/output electrode 6*c* may alternatively be provided from the open-side end surface to the mounting surface.

Thus, in the configuration of the present embodiment, corresponding inner conductors and capacitance-coupled input/output electrodes are provided on slopes near the open-side end surface, so that the distance between the input/output electrodes and the inner conductors is partially shorter. As a consequence, a larger external coupling capacitance Ce can be obtained while achieving the same effects as explained in the first embodiment.

The present embodiment describes a configuration where the inputs and outputs used jointly for transmitting and receiving are externally coupled by electromagnetic coupling. However, the configuration may be arranged so that the input/output electrodes (antenna terminals) used jointly for transmitting and receiving are capacitance-coupled to the inner conductors of the input and outputs. In this case, the input/output electrodes are provided in the removed portion after removing the ridgeline of the input/output electrodes used jointly for transmitting and receiving.

Figure 10:
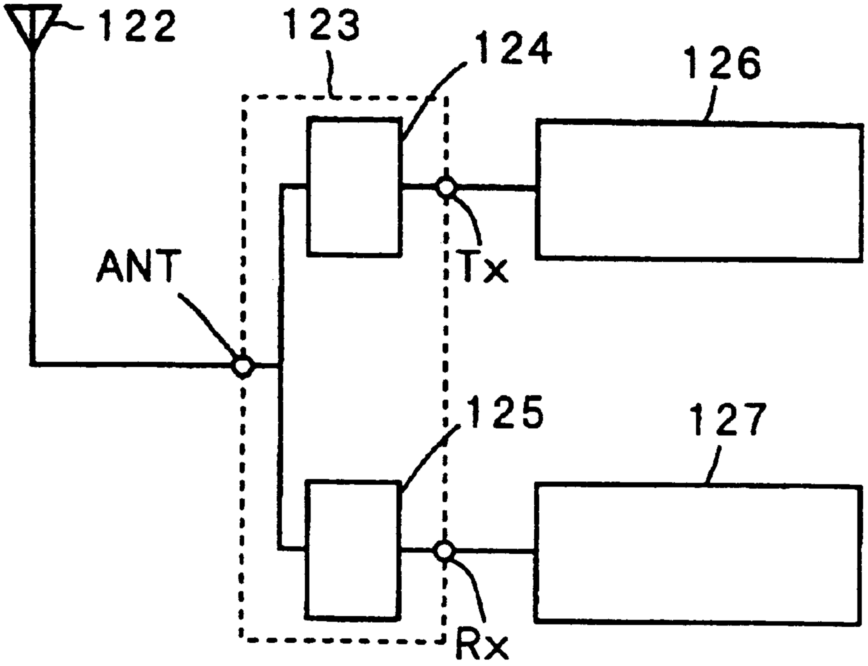
FIG. 10 is a block diagram of a communication apparatus according to a ninth embodiment.
Figure 11A:
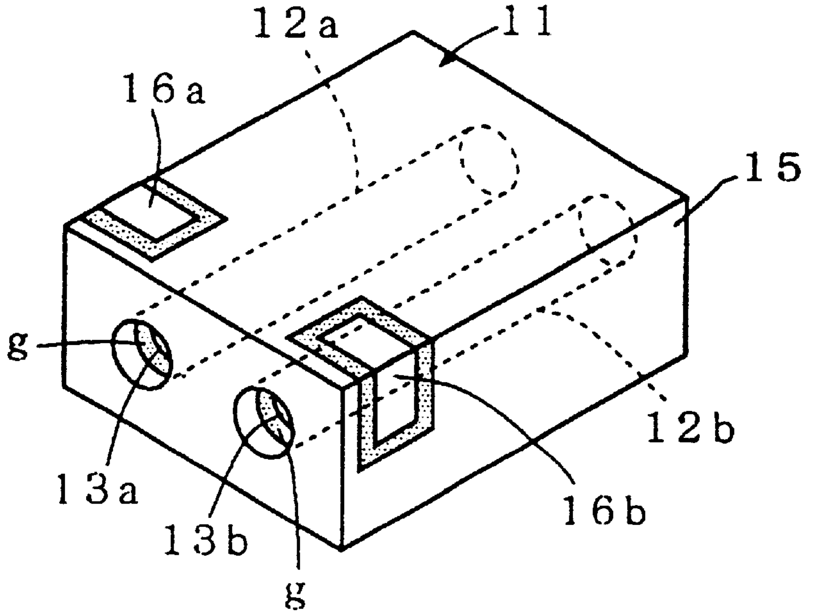
FIG. 11A Prior Art
FIGS. 11A and 11B show a configuration of a conventional dielectric filter, FIG. 11A being a perspective view, and FIG. 11B, a cross-sectional view.
Figure 11B:
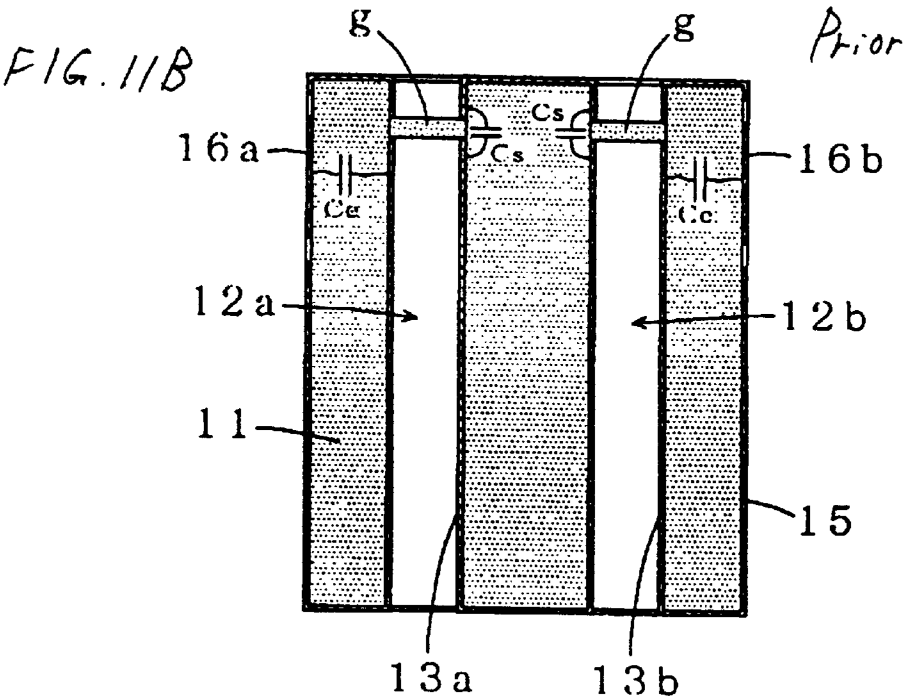
FIG. 11B Prior Art

Next, FIG. 10 shows a communication apparatus according to a ninth embodiment of the present invention. In FIG. 10, numeral 122 represents an antenna, 123 represents a dielectric duplexer, 124 represents a transmission filter, 125 represents a reception filter, 126 represents a transmitter, and 127 represents a receiver. The communication apparatus is formed by connecting an antenna terminal ANT of the dielectric duplexer 123 to an antenna 122, connecting a transmission terminal Tx to the transmitter 126, and connecting a reception terminal Rx to the receiver 127.

Here, one of the dielectric filters described in the first to seventh embodiments can be used as the transmission filter 124 and the reception filter 125. Furthermore, the dielectric duplexer explained in the eighth embodiment can be used as the dielectric duplexer 123. By using the dielectric filter and the dielectric duplexer of the present invention, it is possible to realize an inexpensive communication apparatus having excellent characteristics.

As described above, the dielectric filter and dielectric duplexer of the present invention obtain a greater external coupling capacitance, since the ridgeline between the open-side end surface and the mounting surface of the dielectric block is removed, and input/output electrodes are provided crossing from the removed portion to the mounting surface, thereby shortening the distance between the input/output electrodes and the inner conductors. That is, even when the open end is deeper than the open-side end surface, the input/output electrodes can be provided near the open-side end surface. In addition, the area of the input/output electrodes is small, making it possible to easily obtain a desired external coupling capacitance. Therefore, a desired external coupling can be achieved without adversely affecting the Qo of the resonators.

Furthermore, the removed portion can be more easily molded and cut away by making it a sloping face, a curved face, or a step. In addition, the input/output electrodes can be easily provided. Furthermore, since the input/output electrodes are provided only in one direction on the mounting surface side, the input/output electrodes can be easily provided with high precision. These operations are particularly easy to perform when the removed portion is a slope.

Furthermore, it is possible to confirm the state of the solder from the open-side end surface after mounting.

Furthermore, by mounting the dielectric filter and the dielectric duplexer of the present invention, it is possible to obtain an inexpensive communication apparatus having excellent characteristics.

While the invention has been particularly shown and described with reference to preferred embodiments thereof, it will be understood by those skilled in the art that the forgoing and other changes in form and details may be made therein without departing from the spirit of the invention.

What is claimed is:

1. A communication apparatus comprising:

a dielectric filter which comprises a dielectric block having an outer surface which includes first and second opposing end surfaces and a mounting surface extending between said end surfaces;

a plurality of through-holes extending between said end surfaces;

inner conductors inside the through-holes, each said inner conductor having a respective gap which is disposed near said first end surface;

a ground conductor on said outer surface of the dielectric block;

an edge portion of said dielectric block between said mounting surface and said first end surface being non-parallel and non-perpendicular to said mounting surface and first end surface;

at least one input/output electrode being disposed on both said mounting surface and said edge portion and capacitively coupled to one of said inner conductors.

2. A communication apparatus according to claim 1, wherein said ground conductor is conductively connected to each said inner conductor at said second end surface of said dielectric block.

3. A communication apparatus according to claim 1, wherein said edge portion defines a sloped surface between said mounting surface and said first end surface.

4. A communication apparatus according to claim 1, wherein said edge portion defines a curved surface between said mounting surface and said first end surface.

5. A communication apparatus according to claim 1, further comprising a second filter, having at least one input/output electrode, the respective input/output electrodes of said dielectric filter and said second filter being connected in parallel to an antenna terminal so as to form a duplexer.

6. A communication apparatus according to claim 5, further comprising a transmitter connected to a further input/output electrode of one of said filters and a receiver connected to a further input/output electrode of the other of said filters.

7. A communication apparatus according to claim 1, further comprising a transceiver circuit connected to said at least one input/output electrode of said dielectric filter.

* * * * *